United States Patent
Asanuma et al.

(10) Patent No.: US 7,891,346 B2
(45) Date of Patent: Feb. 22, 2011

(54) BLOWBY GAS RETURNING DEVICE

(75) Inventors: Hiroshi Asanuma, Chita (JP); Hirokazu Konohara, Inazawa (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 494 days.

(21) Appl. No.: 12/073,779

(22) Filed: Mar. 10, 2008

(65) Prior Publication Data
US 2008/0257320 A1    Oct. 23, 2008

(30) Foreign Application Priority Data
Apr. 20, 2007    (JP) ............................. 2007-111378

(51) Int. Cl.
    *F01M 13/00* (2006.01)
(52) U.S. Cl. ..................................... 123/572
(58) Field of Classification Search ......... 123/572–574, 123/41.86
    See application file for complete search history.

(56) References Cited

U.S. PATENT DOCUMENTS

| | | | | |
|---|---|---|---|---|
| 2,362,558 A | * | 11/1944 | Janzich | 123/574 |
| 3,809,035 A | * | 5/1974 | Winton | 123/573 |
| 3,967,605 A | * | 7/1976 | Dolfi, Sr. | 123/574 |
| 4,760,833 A | * | 8/1988 | Tatyrek | 123/574 |
| 4,852,539 A | * | 8/1989 | Pankow | 123/587 |
| 5,201,301 A | * | 4/1993 | Re | 123/573 |
| 5,499,616 A | * | 3/1996 | Enright | 123/572 |
| 6,412,478 B1 | * | 7/2002 | Ruehlow et al. | 123/572 |
| 7,726,288 B2 | * | 6/2010 | Chen | 123/572 |

FOREIGN PATENT DOCUMENTS

| | | |
|---|---|---|
| JP | A-53-148639 | 12/1978 |
| JP | A-60-171915 | 11/1985 |
| JP | U-02-003038 | 1/1990 |
| JP | A-2005-240605 | 9/2005 |

\* cited by examiner

*Primary Examiner*—M. McMahon
(74) *Attorney, Agent, or Firm*—Oliff & Berridge, PLC (57) ABSTRACT

A blowby gas returning device is arranged to allow blowby gas leaking from a combustion chamber of an engine to flow in an intake passage through a returning passage and return to the combustion chamber, and arranged to regulate a flow rate of the blowby gas by a PCV valve provided in the returning passage. This blowby gas returning device comprises an outside-air passage for mixing outside air into the blowby gas before being introduced into the PCV valve; and an open-close valve for opening and closing the outside-air passage. An electronic control unit controls the open-close valve to open when the operating state detected by sensors is an idle state.

10 Claims, 6 Drawing Sheets

FIG. 4A
AIR-FUEL RATIO CORRECTION AMOUNT [%]

FIG. 4B
WATER TEMP. AND OIL TEMP. [°C]

FIG. 4C
ENGINE ROTATION SPEED [rpm]

FIG. 6

BLOWBY GAS RETURNING DEVICE

BACKGROUND OF THE INVENTION

1. Field of the Invention

The present invention relates to a blowby gas returning device for returning blowby gas leaking from a combustion chamber of an engine to the combustion chamber by allowing the blowby gas to flow in a returning passage and an intake passage via a PCV valve.

2. Description of Related Art

Heretofore, some techniques of this type have been known as disclosed in for example JP2005-240605A, JP53-148639 (1978)A, JP60-171915(1985)U, and JP2-3038(1990)U. Particularly, a device disclosed in JP2005-240605A is provided with a blowby gas passage between a crank case and an intake passage in an engine, and a PCV valve is placed in this blowby gas passage. This PCV valve is arranged to control a flow rate of blowby gas by a differential pressure between an inlet port side and an outlet port side of the valve. Here, the blowby gas contains unburned fuel constituent. When this blowby gas is returned to the combustion chamber of the engine, therefore, the fuel constituent contained in the blowby gas is burned together with the fuel normally supplied to the engine.

In the device of JP2005-240605A, however, the fuel constituent contained in the blowby gas may increase in concentration suddenly. In this case, when the blowby gas is returned to the combustion chamber, an air-fuel ratio in the engine may fluctuate to an over-rich side, causing disorder of air-fuel ratio control of the engine. During idling of this engine, especially, the blowby gas would significantly affect the air-fuel ratio. This may cause a change in engine rotational speed and deterioration in exhaust emission. Further, in a direct-injection engine arranged to directly inject fuel into engine cylinders, unburned fuel droplets sticking to a bore wall surface due to fuel injection may flow down along the wall surface and is mixed into a lubricant in an oil pan or receiver. This unburned fuel begins to vaporize when the temperature of the lubricant (oil temperature) rises to "40° C." or more. When such gas is returned to the combustion chamber, accordingly, the air-fuel ratio may fluctuate, causing disorder of the air-fuel ratio control. Here, as to the engine air-fuel ratio control, learning control configured to learn an air-fuel ratio correction value according to an operating state of an engine and reflect it in the control. This type of learning control can deal with the influence of blowby gas returned to the combustion chamber to some extent. However, when the concentration and the volume of the fuel constituent of the blowby gas exceed permissible ranges in the learning control, the learning control could not appropriately respond thereto, thus causing the air-fuel ratio to fluctuate to an over-rich side, leading to disorder of the air-fuel ratio control.

SUMMARY OF THE INVENTION

The present invention has been made in view of the above circumstances and has an object to provide a blowby gas returning device capable of preventing an air-fuel ratio from fluctuating due to blowby gas returned to a combustion chamber.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided A blowby gas returning device including a returning passage and a PCV valve placed in the returning passage, the device being arranged to allow blowby gas leaking from a combustion chamber of an engine to flow in an intake passage through the returning passage and return to the combustion chamber, and arranged to regulate a flow rate of the blowby gas by the PCV valve, wherein the blowby gas returning device comprises: an outside-air passage for mixing outside air into the blowby gas before being introduced into the PCV valve; and an open-close valve for opening and closing the outside-air passage.

According to another aspect, the invention provides a blowby gas returning device including a returning passage and a PCV valve placed in the returning passage, the device being arranged to allow blowby gas leaking from a combustion chamber of a direct injection engine configured to directly inject fuel in the combustion chamber to flow in an intake passage through the returning passage and return to the combustion chamber, and arranged to regulate a flow rate of the blowby gas by a PCV valve provided in the returning passage, wherein the blowby gas returning device comprises: an outside-air passage for mixing outside air into the blowby gas before being introduced into the PCV valve; an open-close valve for opening and closing the outside-air passage; an oil trapping device for trapping oil from the blowby gas before being introduced into the PCV valve; a scavenging passage for introducing outside air into the engine to scavenge the blowby gas from the engine; an operating state detection device for detecting an operating state of the engine; and a valve control device for controlling the open-close valve based on the detected operating state.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

First Embodiment

A detailed description of a first preferred embodiment of an engine system embodying a blowby gas returning device of the present invention will now be given referring to the accompanying drawings.

Figure 1:
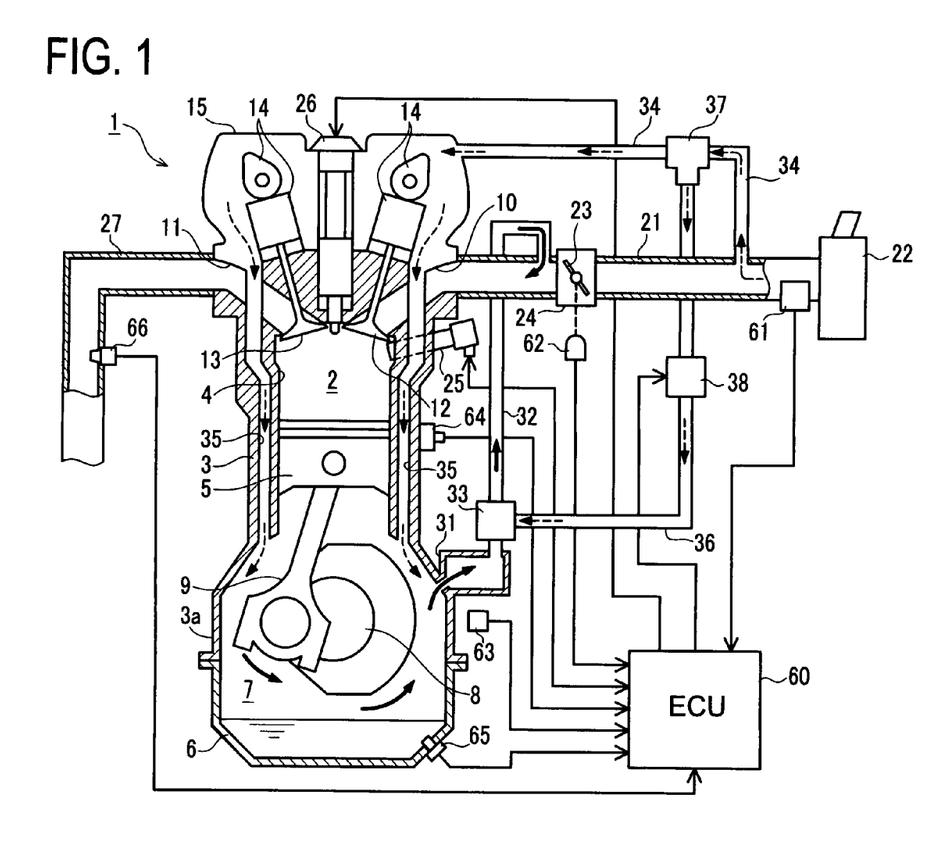
FIG. 1 is a schematic configuration view of an engine system including a blowby gas returning device.

FIG. 1 is a schematic configuration view of the engine system including the blowby gas returning device of the present embodiment. An engine 1 constituting this engine system is a direct-injection multicylinder spark-ignition engine arranged to directly inject fuel into a combustion chamber 2. An engine block 3 of this engine 1 is formed with a plurality of cylinder bores 4 in each of which a piston 5 is placed to be movable up and down. The engine block 3 includes a crank case 3a as a lower part of the engine block 3, and an oil pan 6 combined with the crank case 3a. Those crank case 3a and oil pan 6 form a crank chamber 7. In the crank chamber 7, a crank shaft 8 is rotatably supported, to which each of the piston 5 is connected through a connecting rod 9.

The combustion chamber 2 formed above the piston 5 in each cylinder bore 4 has a pent roof shape slant to be highest at its upper center. In each combustion chamber 2, the engine block 3 is formed at an upper part thereof with an intake port 10 and an exhaust port 11. An intake valve 12 is set in the intake port 10 while an exhaust valve 13 is set in the exhaust port 11. The intake valve 12 and the exhaust valve 13 are opened and closed in association with rotation of the crank shaft 8 by a well known valve operating mechanism 14. By opening and closing of the intake valve 12 and the exhaust valve 13, outside air is introduced in the combustion chamber 2 through the intake port 10 and exhaust gas is discharged after combustion from the combustion chamber 2 to the exhaust port 11. An engine cover 15 is provided on the engine block 3 to cover the valve operating mechanism 14 and others.

The intake port 10 is connected to an intake passage 21 including an intake manifold. An inlet port of this intake passage 21 is connected to an air cleaner 22. A throttle body 24 including a throttle valve 23 is mounted in a predetermined portion of the intake passage 21. The throttle valve 23 is opened and closed in synchronization with operation of an accelerator pedal (not shown) mounted on a driver's side floor. The air purified by the air cleaner 22 is sucked in the combustion chamber 2 via the intake passage 21, the throttle body 24, and the intake port 10. An amount of this sucked air is regulated by an opening degree of the throttle valve 23. To the engine block 3, an injector 25 is attached to directly inject fuel into each combustion chamber 2. The fuel injected from the injector 25 into the combustion chamber 2 is mixed with the air sucked in the combustion chamber 2 through the intake port 10, forming an air-fuel mixture. An ignition plug 26 is also provided at the top of the engine block 3 to ignite the air-fuel mixture in each combustion chamber 2.

The exhaust port 11 is connected with an exhaust passage 27 including the exhaust manifold. The exhaust gas generated in each combustion chamber 2 after combustion is exhausted to the outside through the exhaust port 11 and the exhaust passage 27.

The aforementioned engine 1 is provided with a blowby as returning device for allowing blowby gas leaking from each combustion chamber 2 to flow in the intake passage 21 and return to each combustion chamber 2. Specifically, the crank case 3a is provided with an oil separator 31 communicated with the crank chamber 7. This oil separator 31 has a function for separating oil such as lubricant mixed with the blowby gas in the crank chamber 7 from the blowby gas, and trapping the separated oil. Thus, the oil separator 31 corresponds to an oil trapping device of the invention. A returning passage 32 is arranged between the oil separator 31 and the intake passage 21 downstream of the throttle valve 23 to allow the blowby gas to flow from the crank chamber 7 into the intake passage 21. In a predetermined portion of the returning passage 32, a PCV valve 33 is mounted for regulating a flow rate of the blowby gas. The configuration of the PCV valve 33 will be mentioned later in detail. Between the intake passage 21 near the air cleaner 22 and the engine cover 15, a scavenging passage 34 is arranged to introduce outside air into the crank chamber 7 in order to scavenge the blowby gas from the crank chamber 7 of the engine 1. The engine block 3 is formed with vent holes 35 for providing communication between the crank chamber 7 and the inside of the engine cover 15. Through each vent hole 35, the outside air taken in the engine cover 15 is allowed to flow in the crank chamber 7. Each vent hole 35 also constitutes part of the scavenging passage 34. Further, one end of an outside-air passage 36 is connected to the PCV valve 33 to mix outside air with the blowby gas to be introduced into the PCV valve 33. The other end of the outside-air passage 36 is connected to the scavenging passage 34 via a three-way valve 37. This three-way valve 37 is operated to provide communication between the scavenging passage 34 and the outside-air passage 36 in a three way configuration. In a predetermined portion of the outside-air passage 36, an electromagnetic open-close valve 38 is mounted, whereby the passage 36 is opened and closed.

Figure 2:
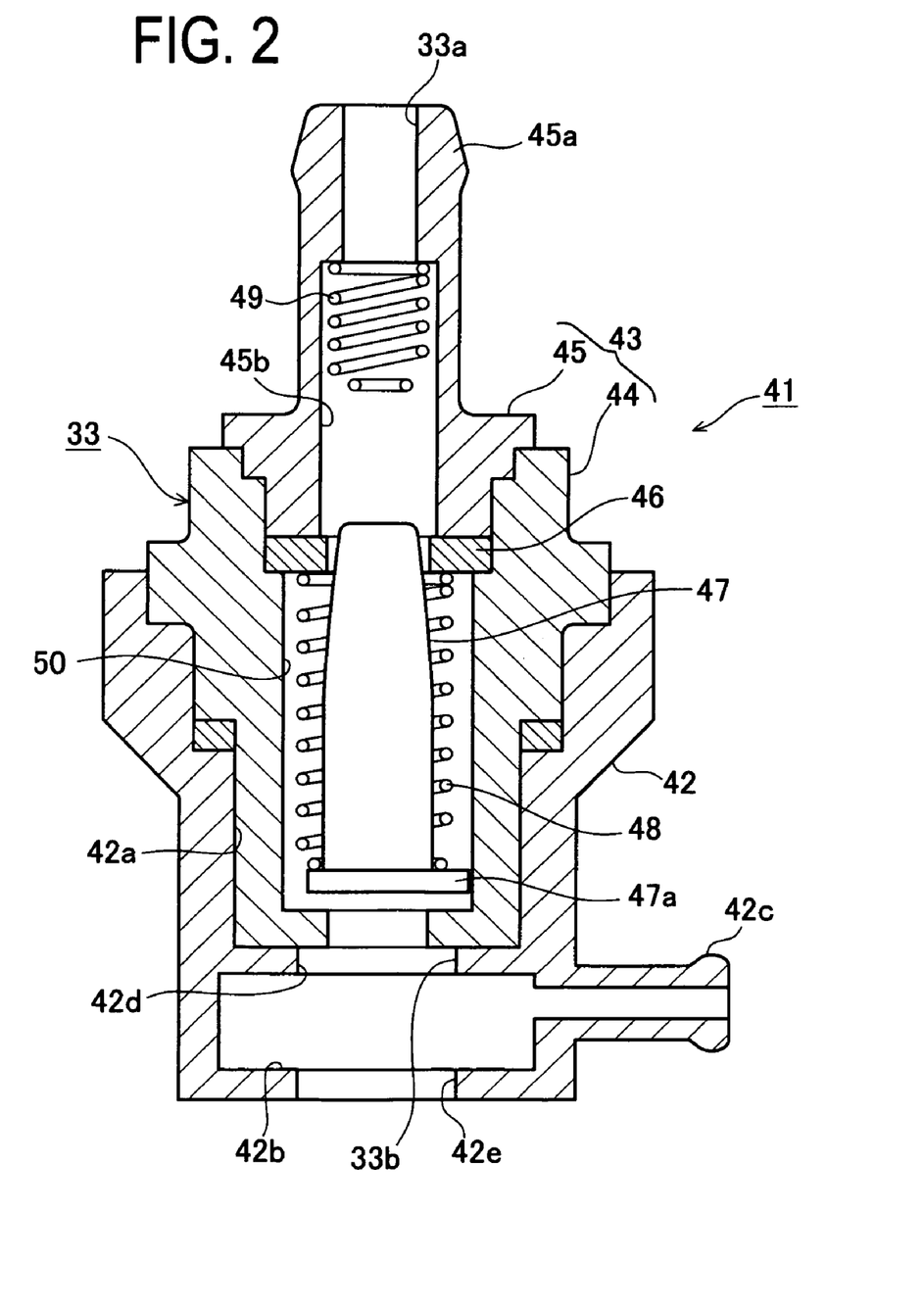
FIG. 2 is a sectional view of a valve unit including a PCV valve.

Here, a detail explanation will be given to the configuration of the PCV valve 33. FIG. 2 is a sectional view of a valve unit 41 including the PCV valve 33. The valve unit 41 is constituted by the PCV valve 33 and an adaptor 42 fit on the valve 33. This PCV valve 33 includes a hollow housing 43. The housing 43 is constituted by a main housing 44 and a sub housing 45 which are cylindrical and assembled together. The main housing 44 is internally provided with a valve seat 46, a valve element 47, and a spring 48. The sub housing 45 is internally provided with a spring 49. The sub housing 45 is fixed to the main housing 44 in such a way that a proximal end of the sub housing 45 is fit in an open end of the main housing 44. A distal end of the sub housing 45 is provided with a pipe joint 45a. An open end of this pipe joint 45a serves as an outlet port 33a of the PCV valve 33. This pipe joint 45a is connected to the returning passage 32 connected to the intake passage 21. A hollow of the main housing 44 forms a valve chamber 50 in which the valve element 47 and the spring 48 are housed. One end wall (a bottom wall in FIG. 2) of the main housing 44 is formed with an inlet port 33b of the PCV valve 33 so as to communicate with the valve chamber 50. The sub housing 45 includes a hollow 45b communicated with the valve chamber 50 of the main housing 44. The annular valve seat 46 is placed between the main housing 44 and the sub housing 45. The valve chamber 50 and the hollow 45b are communicated with each other through the valve seat 46. In the valve chamber 50, the valve element 47 is disposed to be axially movable relative to the valve seat 46. The valve element 47 has a nearly columnar shape and insertable through the valve seat 46. The valve element 47 is shaped so that its distal end is gradually decreased in diameter. Accordingly, when the valve element 47 is moved axially, a clearance (an opening degree) between the valve seat 46 and the valve element 47 is changed. By changing this clearance (the opening degree), a flow rate of blowby gas allowed to flow in the PCV valve 33 is regulated. The proximal end of the valve element 47 located near the inlet port 33b is formed with a flange 47a. The flange 47a has a shape permitting passage of the blowby gas. The spring 48 is mounted between the valve seat 46 and the flange 47a to urge the valve element 47 toward the inlet port 33b.

The adaptor 42 is fit on the main housing 44 to cover the outer periphery thereof. The adaptor 42 is of a nearly cylindrical shape having a hollow 42a and internally formed, at a part under the hollow 42a, with a mixing chamber 42b for mixing blowby gas with outside air. The adaptor 42 is formed, at its proximal end, with a pipe joint 42c communicated to the mixing chamber 42b. This pipe joint 42c is connected to the outside-air passage 36. The mixing chamber 42b of the adaptor 42 is communicated to the inlet port 33b of the PCV valve 33 through a vent hole 42d. The adaptor 42 is formed, at its bottom, with an inlet port 42e opening into the mixing chamber 42b. This inlet port 42e is connected to the oil separator 31.

In the valve unit 41 shown in FIG. 2, intake negative pressure in the intake passage 21 acts on the outlet port 33a of the PCV valve 33 through the returning passage 32. Further, the blowby gas introduced in the inlet port 42e of the adaptor 42 is then introduced in the inlet port 33b of the PCV valve 33 via the mixing chamber 42b. In the valve chamber 50 of the PCV valve 33, the intake negative pressure, blowby gas pressure, and the urging force (pressure) of the spring 48 act on the valve element 47. By a balance between those pressures, the valve element 47 is moved toward the valve seat 46, thereby changing the clearance (the opening degree) between the valve seat 46 and the valve element 47. This regulates the flow rate of blowby gas to be allowed to flow from the valve chamber 50 of the main housing 44 to the hollow 45b of the sub housing 45, that is, to be dispensed by the PCV valve 33. When the distal end of the valve element 47 comes into contact with the spring 49 placed in the hollow 45b, the valve element 47 is restricted in movement.

To control the engine system shown in FIG. 1, an electronic control unit (ECU) 60 is provided. An air flow-meter 61 is installed on an upstream side of the intake passage 21 to measure an intake air amount QA. The throttle body 24 is provided with a throttle sensor 62 for detecting an opening degree (a throttle opening degree) TA of the throttle valve 23. The engine block 3 is provided with a crank angle sensor 63 for detecting a rotation angle (a crank angle) of the crank shaft 8 as engine rotation speed NE. The engine block 3 is provided with a water temperature sensor 64 for detecting cooling water temperature THW. The oil pan 6 is provided with an oil temperature sensor 65 for detecting lubricant temperature (oil temperature) THO. In the exhaust passage 27, an oxygen sensor 66 is installed for detecting oxygen concentration Ox in exhaust gas. The above sensors 61 to 66 correspond to an operating state detection device of the invention. The ECU 60 is configured to determine intake, compression, expansion (explosion), and exhaust strokes in each cylinder based on the crank angle detected by the crank angle sensor 63 and to calculate the engine rotation speed NE. The ECU 60 is further arranged to execute fuel injection control, ignition timing control, blowby gas returning control, and others based on the intake air amount QA, the throttle opening degree TA, the engine rotation speed NE, the cooling water temperature THW, the oil temperature THO, and the oxygen concentration Ox which are detected by the above sensors 61 to 66. The ECU 60 conducts the fuel injection control to control the injector 25. The ECU 60 executes the ignition timing control to control the ignition plug 26. The ECU 60 executes the blowby gas returning control to control the open-close valve 38. In the present embodiment, the ECU 60 corresponds to a valve control device of the invention.

In the present embodiment, the ECU 60 executes the air-fuel ratio control including the learning control as part of the fuel injection control. Specifically, in injecting fuel from the injector 25, the ECU 60 conducts the air-fuel ratio control so that the amount of fuel to be injected by the injector 25 is regulated to meet a required air-fuel ratio of the engine 1 that changes according to the operating state such as the engine rotation speed NE, an engine load state, and an engine warm-up state. To have the actual air-fuel ratio coincide with the required air-fuel ratio, the ECU 60 calculates an actual air-fuel ratio from the oxygen concentration Ox detected by the oxygen sensor 66 and executes air-fuel ratio feedback control so that the actual air-fuel ratio coincides with the required air-fuel ratio. As the air-fuel ratio learning control, the ECU 60 evaluates and stores past control results and, based on the evaluation, stores and corrects an air-fuel ratio correction amount for the air-fuel ratio control. In other words, in response to individual difference of the engine 1, deterioration thereof with age, or use environment condition, the ECU 60 corrects and stores in advance the air-fuel ratio correction amount in various operating regions of the engine 1 so that the stored air-fuel ratio correction amount is read according to the operating regions and reflected in the air-fuel ratio control at next startup even after the engine 1 is stopped. Accordingly, in the engine system of the present embodiment, in addition to the fuel injection amount by the injector 25, the fuel constituent concentration in the blowby gas which will be returned to the combustion chamber 2 can be reflected in the air-fuel ratio control including the learning control. In the present embodiment, the air-fuel ratio control including the learning control adopts well known control details and thus its specific explanation is omitted here.

However, even in the engine system that executes the air-fuel ratio control including this type of learning control, the fuel constituent concentration in the blowby gas to be returned to the combustion chamber 2 may exceed a permissible range in the learning control. In the present embodiment, therefore, the ECU 60 executes the blowby gas returning control in order to restrain the influence of blowby gas returned to the combustion chamber 2 on the air-fuel ratio control.

Figure 3:
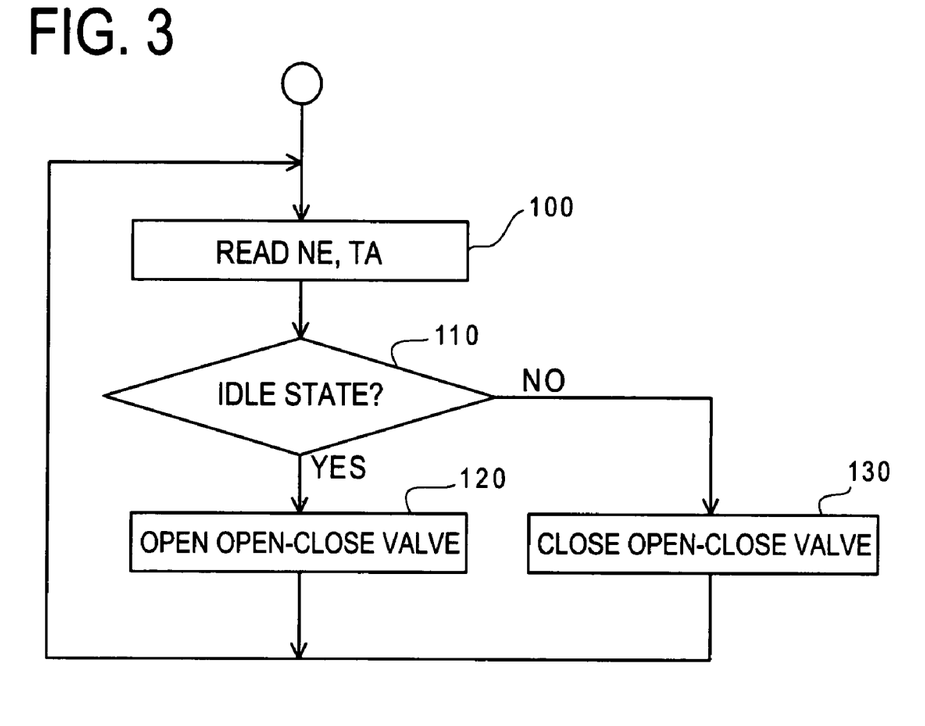
FIG. 3 is a flowchart showing details of blowby gas returning control.

FIG. 3 is a flowchart showing the details of the blowby gas returning control. The ECU 60 executes this control after the start of the engine 1.

Specifically, at step 100, the ECU 60 reads the engine rotation speed NE calculated based on the crank angle detected by the crank angle sensor 63 and the throttle opening degree TA detected by the throttle sensor 62 respectively. The ECU 60 then determines at step 110 whether or not the engine 1 is in an idle state based on the read engine rotation speed NE and throttle opening degree TA. For instance, if the throttle opening degree TA indicates a full closed state and the engine rotation speed NE is a predetermined value (an idle rotation speed range), the ECU 60 determines that the engine 1 is in the idle state. Here, it is determined whether or not the engine 1 is in the idle state because the blowby gas strongly affects the air-fuel ratio during the idle state.

If an affirmative result is obtained at step 110, the ECU 60 opens the open-close valve 38 at step 120 and advances the process to step 100. If a negative result is obtained at step 110, on the other hand, the ECU 60 closes the open-close valve 38 at step 130 and advances the process to step 100. In this blowby gas returning control, specifically, the open-close valve 38 is opened during the idle state of the engine 1 to mix outside air supplied through the outside-air passage 36 into the blowby gas introduced into the inlet port 33b of the PCV valve 33.

According to the blowby gas returning device in the engine system of the present embodiment explained above, the blowby gas leaking from the combustion chamber 2 to the crank chamber 7 during operation of the engine 1 is allowed to flow from the crank chamber 7 to the intake passage 21 via the oil separator 31, the PCV valve 33, and the returning passage 32, and be returned to the combustion chamber 2, the blowby gas will be burned. The flow rate of blowby gas in the returning passage 32 is regulated by the PCV valve 33.

In the present embodiment, the blowby gas introduced into the inlet port 33b of the PCV valve 33 is mixed with the outside air introduced through the outside-air passage 36 which is opened and closed by the open-close valve 38. Accordingly, when the open-close valve 38 is opened, allowing the outside air to be mixed into the blowby gas introduced into the inlet port 33b of the PCV valve 33, thereby diluting the blowby gas allowed to flow from the PCV valve 33 to the intake passage 21 via the returning passage 32. This makes it possible to prevent the air-fuel ratio from fluctuating to an over-rich side by the blowby gas returned to the combustion chamber 2 and hence avoid disorder of the air-fuel ratio control.

Especially, in the present embodiment, the ECU 60 is arranged to specify the idle state in which the blowby gas tends to largely affect the air-fuel ratio of the engine 1, and open the open-close valve 38 when the operating state of the engine 1 detected by the sensors 61 to 66 comes to the idle state. Thus, during the idle state in which the blowby gas adversely affects the air-fuel ratio, the blowby gas can be diluted by the outside air. This makes it possible to prevent fluctuation of air-fuel ratio due to the blowby gas according to the operating state of the engine 1, particularly, during the idle state.

Figure 4A:
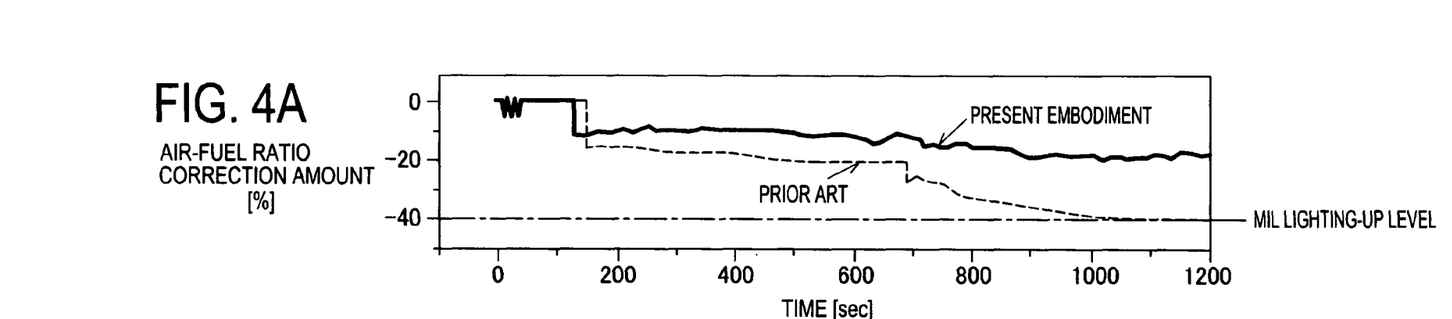
FIG. 4 is a graph showing changes with time in air-fuel ratio correction amount, water and oil temperatures, and engine rotation speed.
Figure 4B:
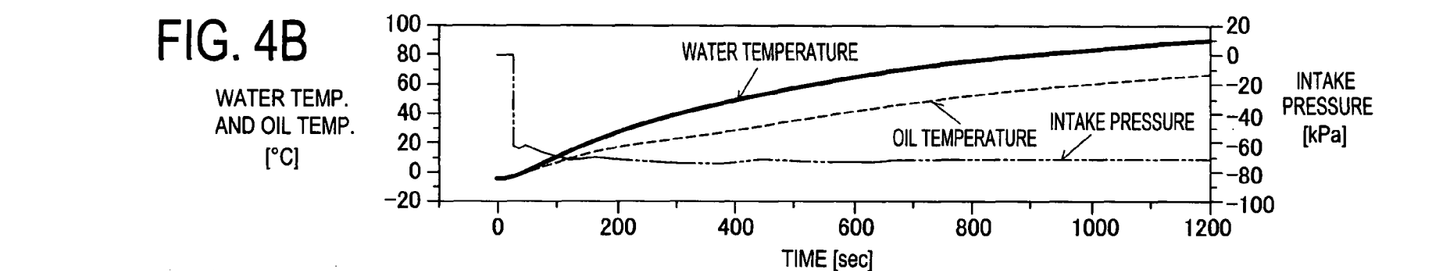
Figure 4C:
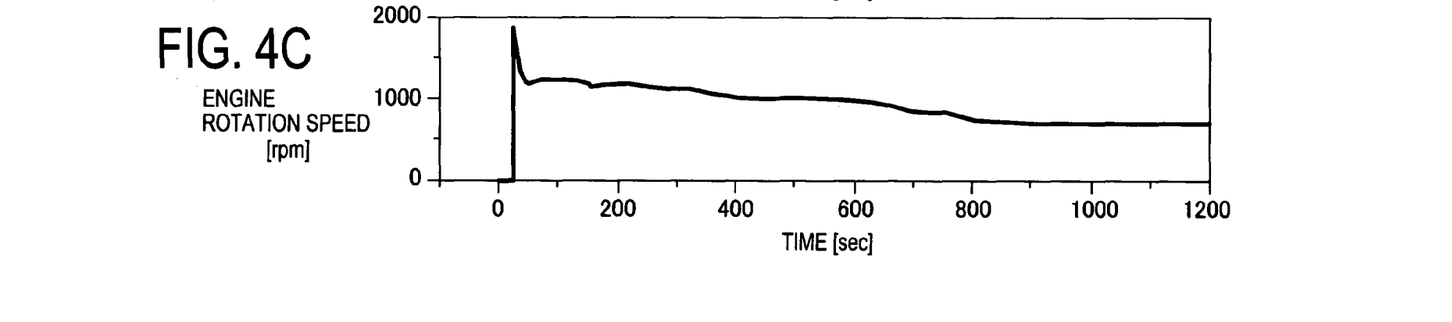

FIGS. 4A to 4C are graphs showing changes with time of the air-fuel ratio correction amount, water temperature and oil temperature, and engine rotation speed of the engine 1 which is started at "−10° C." and remains in the idle state. In FIG. 4A, a solid line represents changes in the air-fuel ratio correction value in the present embodiment and a broken line represents changes in the air-fuel ratio correction value in the prior art where the outside-air passage 36 and the open-close valve 38 are not mounted. As is found from this graph, in the case of the present embodiment, when the engine 1 comes to the idle state after startup, the open-close valve 38 is opened, causing mixture of the outside air into the blowby gas introduced into the PCV valve 33. Accordingly, the fuel constituent concentration of the blowby gas is reduced and kept at that level. As shown in FIG. 4A, therefore, the air-fuel ratio correction amount varies in a range of "−10 to −20" relatively close to "0". This shows that the influence of the blowby gas on the air-fuel ratio is restrained. As shown in FIGS. 4B and 4C, it is also found that the water temperature (cooling water temperature THW), oil temperature THO, intake pressure, and engine rotation speed NE vary relatively stably without particularly sharp change. In the prior art in which no outside air is mixed into the blowby gas, on the other hand, it is found as indicated by the broken line in FIG. 4A that the air-fuel ratio correction amount gradually goes away from "0" and finally reaches "−40" which is an abnormal level (MIL lighting-up level). This graph reveals that the blowby gas returning device of the present embodiment is effective in the air-fuel ratio control.

In the present embodiment, furthermore, the oil separator 31 is provided for trapping oil such as lubricant from the blowby gas before being introduced into the PCV valve 33. The oil is thus trapped from the blowby gas by the oil separator 31 before the blowby gas is introduced into the PCV valve 33, so that unnecessary oil is unlikely to flow in the PCV valve 33. This makes it possible to prevent the oil from sticking to the valve seat 46 and the valve element 47 and avoid a stuck state of the valve element 47, hence prevent malfunction of the PCV valve 33.

In the present embodiment, the scavenging passage 34 and the vent hole 35 are provided for introducing outside air into the crank chamber 7 in order to scavenge the blowby gas from the crank chamber 7. Accordingly, the blowby gas is scavenged out of the crank chamber 7 by the outside air introduced into the crank chamber 7. The blowby gas leaking from the combustion chamber 2 to the crank chamber 7 at that time is also diluted by the outside air for scavenging. In this regard, the effect of preventing fluctuation of the air-fuel ratio due to the blowby gas can be enhanced.

In the direct injection engine 1 of the present embodiment, the fuel is directly injected from the injector 25 into the combustion chamber 2. Thus, unburned fuel droplets may flow down along the wall surface of the cylinder bore 4 and into the crank chamber 7, and mix into the lubricant in the oil pan 6. The present embodiment is therefore advantageous in achieving the above operations and effects related to the blowby gas, particularly, in the direct injection engine 1.

Second Embodiment

Next, a second embodiment embodying an engine system embodying a blowby gas returning device of the present invention will now be given referring to the accompanying drawings.

In the second and subsequent embodiments explained below, identical components or parts to those in the first embodiment are given the same reference signs as in the first embodiment. The following explanation is made with a focus on differences from the first embodiment.

Figure 5:
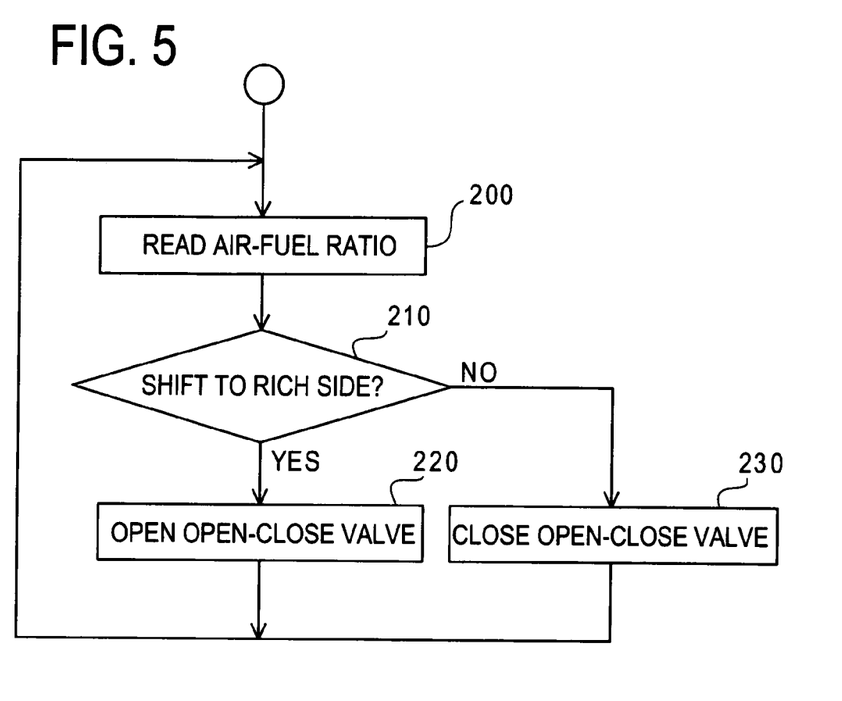
FIG. 5 is a flowchart showing details of the blowby gas returning control.

The second embodiment differs from the first embodiment in the details of the blowby gas returning control to be executed by the ECU 60. FIG. 5 is a flowchart showing the details of the blowby gas returning control. The ECU 60 executes this control after the start of the engine 1.

Specifically, at step 200, the ECU 60 reads the air-fuel ratio calculated from the oxygen concentration Ox detected by the oxygen sensor 66. The ECU 60 determines at step 210 whether or not the read air-fuel ratio is shifting to rich side. This determination is made to judge whether or not the air-fuel ratio of the engine 1 is becoming rich due to the blowby gas.

If an affirmative result is obtained at step 210, the ECU 60 opens the open-close valve 38 at step 220 and advances the process to step 200. If a negative result is obtained at step 210, on the other hand, the ECU 60 closes the open-close valve 38 at step 230 and advances the process to step 200. In this blowby gas returning control, specifically, the open-close valve 38 is opened when the air-fuel ratio of the engine 1 is actually shifting to the rich side due to the blowby gas, thereby mixing the outside air supplied through the outside-air passage 36 into the blowby gas introduced into the PCV valve 33.

According to the second embodiment, as explained above, the ECU 60 opens the open-close valve 38 based on a detection result of the oxygen sensor 66 showing that the operating state of the engine 1 corresponds to the air-fuel ratio that is shifting to the rich side. This opening of the open-close valve 38 causes the blowby gas to be diluted by the outside air, thereby preventing the air-fuel ratio from becoming rich. During operation of the engine 1, particularly, when the air-fuel ratio is shifting to the rich side, it is possible to prevent the air-fuel ratio from fluctuating to an over-rich side due to the blowby gas returned to the combustion chamber 2, and hence avoid disorder of the air-fuel ratio control. The other operations and effects in the present embodiment are equal to those in the first embodiment.

Third Embodiment

Next, a third embodiment of an engine system embodying a blowby gas returning device of the present invention will now be given referring to the accompanying drawings.

Figure 6:
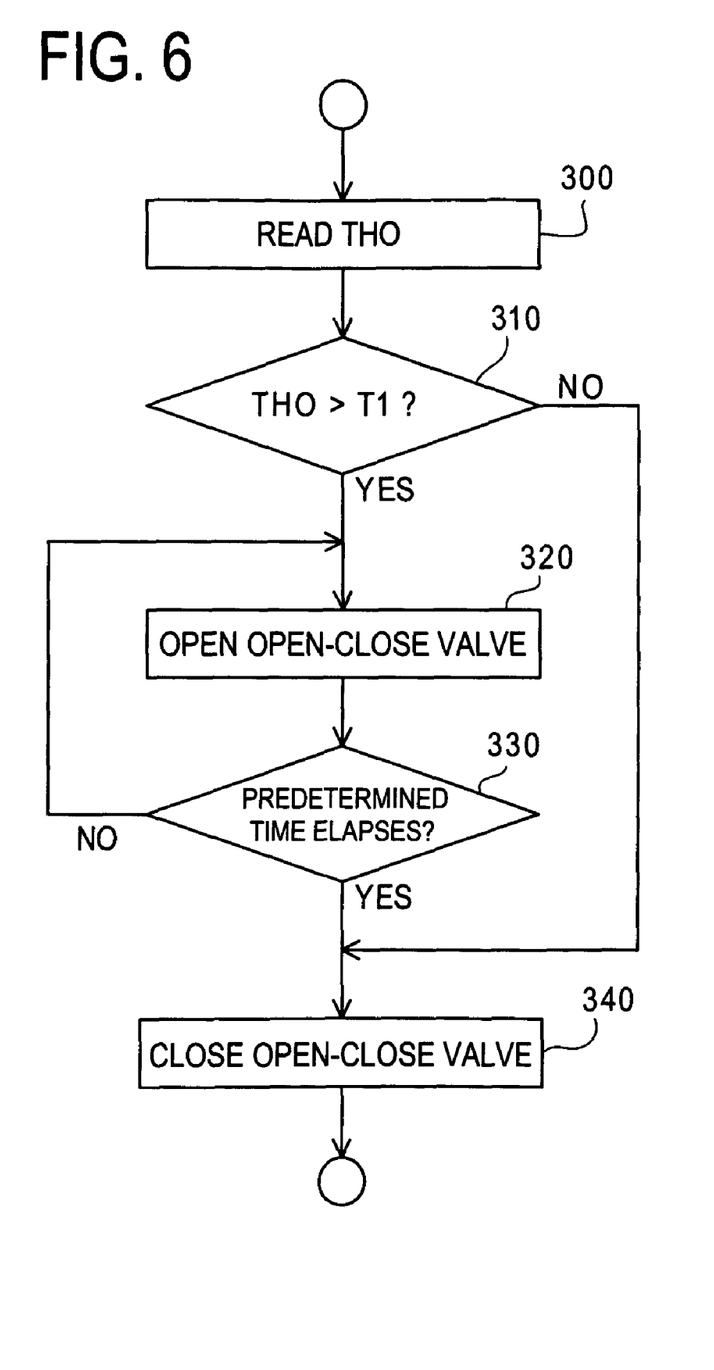
FIG. 6 is a flowchart showing details of the blowby gas returning control.

The third embodiment differs from the first and second embodiments in the details of the blowby gas returning control to be executed by the 60. FIG. 6 is a flowchart showing the details of the blowby gas returning control. The ECU 60 executes this control after the start of the engine 1.

Specifically, at step 300, the ECU 60 reads the oil temperature THO detected by the oil temperature sensor 65. The ECU 60 determines at step 310 whether or not the read oil temperature THO is higher than a predetermined value T1 (e.g. "−40° C."). This determination is made to check that the blowby gas mixed in the lubricant in the oil pan 6 begins to vaporize when the oil temperature THO exceeds the predetermined value T1, leading to an increase in fuel constituent concentration of the blowby gas in the crank chamber 7.

If a negative result is obtained at step 310, the ECU 60 closes the open-close valve 38 at step 340. If an affirmative result is obtained at step 310, on the other hand, the ECU 60 opens the open-close valve 38 at step 320. At step 330, the ECU 60 successively determines whether or not a predetermined time elapses from the opening of the open-close valve 38. This determination is conducted because the opening of the open-close valve 38 for a predetermined time allows the outside air to be mixed into the blowby gas, thereby sufficiently reducing the fuel constituent concentration. Until the predetermined time elapses at step 330, the ECU 60 continuously holds the open-close valve 38 in an open state at step 320. When the predetermined time elapses at step 330, the ECU 60 closes the open-close valve 38 at step 340.

In other words, this blowby gas returning control is configured to open the open-close valve 38 for the predetermined time when the oil temperature THO in the oil pan 6 exceeds the predetermined value T1 during operation of the engine 1, thereby mixing the outside air supplied through the outside-air passage 36 into the blowby gas introduced into the PCV valve 33.

In the present embodiment, as explained above, when the oil temperature THO detected by the oil temperature sensor 65 exceeds the predetermined vale, the ECU 60 opens the open-close valve 38 only for the predetermined time to admit outside air into the PCV valve 33. This outside air dilutes the blowby gas, preventing the air-fuel ratio of the engine 1 from becoming rich. Accordingly, during operation of the engine 1, particularly, in an operating state that causes an increase in the oil temperature THO, it is possible to prevent the air-fuel ratio from fluctuating to an over-rich side due to the blowby gas, hence avoid disorder of the air-fuel ratio control. The other operations and effects in the present embodiment are equal to those in the first embodiment.

The present invention is not limited to the aforementioned embodiments and may be embodied in other specific forms without departing from the essential characteristics thereof.

In each of the above embodiments, in FIG. 1, the inlet port of the outside-air passage 36 is connected to the scavenging passage 34 through the three-way valve 37. As an alternate, the inlet port of this outside-air passage 36 may be opened directly into the atmosphere or connected to the air cleaner 22.

In each of the above embodiments, the mixing chamber 42b formed in the adopter 42 constituting the PCV valve 33 and the valve unit 41 is designed to be hollow, but an oil filter or the like may be set in the mixing chamber 42b to provide an oil trapping function. In this case, residual oil in the blowby gas can efficiently be trapped and removed by the oil filter or the like.

In each of the above embodiments, the open-close valve 38 of the outside-air passage 36 may be controlled to open at a decelerated operation of the engine 1 (at an interruption of fuel supply or at a rapid deceleration). In this case, the open-close valve 38 is opened when it is unnecessary to deal with a large amount of blowby gas to dilute the blowby gas. Thus, an amount of oil mist contained in the blowby gas and carried away therewith can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A blowby gas returning device including, a returning passage and a PCV valve placed in the returning passage, the device being arranged to allow blowby gas leaking from a combustion chamber of an engine to flow in an intake passage through the returning passage and to return to the combustion chamber, and arranged to regulate a flow rate of the blowby gas by the PCV valve, the blowby gas returning device comprising:

an outside-air passage for mixing outside air with the blowby gas before entering the PCV valve;

an open-close valve for opening and closing the outside-air passage;

an operating state detection device for detecting an operating state of the engine; and a valve control device for controlling the open-close valve based on the detected operating state, wherein the valve control device opens the open-close valve when the detected operating state is an idle state.

2. The blowby gas returning device according to claim 1 further comprising an oil trapping device for trapping oil from the blowby gas before entering the PCV valve.

3. The blowby gas returning device according to claim 1 further comprising a scavenging passage for introducing outside air into the engine to scavenge the blowby gas from the engine.

4. The blowby gas returning device according to claim 1, wherein the engine is a direct injection engine arranged to directly inject fuel into the combustion chamber.

5. A blowby gas returning device including, a returning passage and a PCV valve placed in the returning passage, the device being arranged to allow blowby gas leaking from a combustion chamber of an engine to flow in an intake passage through the returning passage and return to the combustion chamber, and arranged to regulate a flow rate of the blowby gas by the PCV valve, the blowby gas returning device comprising:

an outside-air passage for mixing outside air with the blowby gas before entering the PCV valve, an open-close valve for opening and closing the outside-air passage;

an operating state detection device for detecting an operating state of the engine; and a valve control device for controlling the open-close valve based on the detected operating state, wherein the valve control device opens the open-close valve when the detected operating state corresponds to an air-fuel ratio that is shifting to a rich side.

6. The blowby gas returning device according to claim 5 further comprising an oil trapping device for trapping oil from the blowby gas before entering the PCV valve.

7. The blowby gas returning device according to claim 5 further comprising a scavenging passage for introducing outside air into the engine to scavenge the blowby gas from the engine.

8. The blowby gas returning device according to claim 5, wherein the engine is a direct injection engine arranged to directly inject fuel into the combustion chamber.

9. A blowby gas returning device including, a returning passage and a PCV valve placed in the returning passage, the device being arranged to allow blowby gas leaking from a combustion chamber of a direct injection engine configured to directly inject fuel in the combustion chamber to flow in an intake passage through the returning passage and return to the combustion chamber, and arranged to regulate a flow rate of the blowby gas by the PCV valve provided in the returning passage, the blowby gas returning device comprising:

- an outside-air passage for mixing outside air into the blowby gas before entering the PCV valve;
- an open-close valve for opening and closing the outside-air passage;
- an oil trapping device for trapping oil from the blowby gas before entering the PCV valve;
- a scavenging passage for introducing outside air into the direct injection engine to scavenge the blowby gas from the direct injection engine;
- an operating state detection device for detecting an operating state of the direct injection engine; and
- a valve control device for controlling the open-close valve based on the detected operating state, wherein
- the valve control device opens the open-close valve when the detected operating state is an idle state.

10. The blowby gas returning device according to claim 9, wherein the valve control device opens the open-close valve when the detected operating state corresponds to an air-fuel ratio that is shifting to a rich side.

* * * * *